United States Patent
Cherry et al.

[15] 3,668,419
[45] June 6, 1972

[54] ELECTRICAL POWER SOURCE AND HEAT AUGMENTATION SYSTEM FOR USE IN AUTOMOTIVE VEHICLES

[72] Inventors: James R. Cherry, Barrington; Theodore A. Byles, Villa Park; Ole K. Nilssen, Barrington Hills, all of Ill.

[73] Assignee: Motorola, Inc., Franklin Park, Ill.

[22] Filed: Dec. 30, 1970

[21] Appl. No.: 102,808

[52] U.S. Cl. .................................307/66, 307/10 R, 307/84, 219/202
[51] Int. Cl. .................................................H02j 7/00
[58] Field of Search......................307/10, 84, 18, 29, 64, 66; 219/202, 279

[56] References Cited

UNITED STATES PATENTS 2,158,733  5/1939  Sola ..................................219/202 X
2,085,275  6/1939  Schmidt ..........................219/202 UX Primary Examiner—Herman J. Hohauser
Attorney—Mueller and Aichele

[57] ABSTRACT

An auxiliary heat supply and electrical power source for a vehicle is comprised of first and second independently controlled alternators connected in tandem to a common shaft. The output of the first alternator is connected to a conventional electrical load and the output of the second alternator may be connected to a heat producing resistive load. The output of the second alternator can be controlled by circuitry including switches operating in cooperation with a conventional heating system and a fan speed control mechanism.

7 Claims, 4 Drawing Figures

Inventors
THEODORE A. BYLES
JAMES R. CHERRY
OLE K. NILSSEN.
BY Mueller & Aichele
ATTYS.

ELECTRICAL POWER SOURCE AND HEAT AUGMENTATION SYSTEM FOR USE IN AUTOMOTIVE VEHICLES

BACKGROUND OF THE INVENTION

Automotive and other vehicles with fluid cooled, internal combustion engines usually come equipped with conventional heater systems, each including a means for delivering heat from the engine coolant into the air and, perhaps, a fan for forcing the heated air through a duct system including a plenum chamber. The heated air is utilized to warm the occupants and to defrost the windows of the passenger compartment. As most drivers and passengers of automobiles are aware, however, a substantial length of time is required after the engine is started before the coolant is heated to a sufficiently high temperature to enable the conventional heating system to effectively produce heat. During this time the occupants of the vehicle must endure the cold, and ice may form on the windshield thereby impairing the driver's visibility and creating a dangerous situation.

Electrically power heating systems have been proposed to solve these problems by replacing or by supplementing the conventional heater during its warm up period. Auxiliary heating systems instantly supply heat immediately after the engine is started and until the conventional heating system is operative. These prior art auxiliary and "quick" heat systems usually convert electrical energy into heat energy by supplying electrical power from the generator or battery of the vehicle to a heat producing load comprised of resistive heating elements located near the fan of the conventional heating system so that the air heated thereby can be forced into the passenger compartment and onto the windshield. A substantial amount of electrical power and, therefore, current must be applied to the heat producing elements to produce enough of this quick or instant heat to rapidly heat the passenger compartment while simultaneously defrosting the windshield.

These are some problems with the prior art quick heat systems. Conventional generators and alternators are not designed to supply enough electrical power for quickly warming the passenger compartment and effectively defrosting the windshield while supplying the other electrical requirements of the vehicle. Thus, the output of the conventional alternator or generator must be alternately switched between the heating load and the conventional load.

One prior art quick heat system includes a set of switching contacts, such as those of an expensive, heavy duty relay, between the output of the conventional alternator or generator of an automotive vehicle and the heating elements for this purpose. Because all of the heating current must be frequently switched by this set of contacts, it is subjected to the deleterious effects such as those caused by arcing and wear. Consequently, such contacts may have to be regularly replaced and they add complexity and cost to the system.

The foregoing approach is also undesirable because the storage battery cannot sustain the electrical requirements of the conventional electrical load for more than an undesirably short time thereby increasing the switching frequency and decreasing the amount of heat which can be supplied. Also, solid state components of the rectifier and regulator associated with alternators and generators found in modern vehicles may be adversely affected by voltage and current transients developed by the relatively large amount of energy released from the inductance of the windings of the alternator or generator when the output thereof is briefly open circuited while being switched between the conventional electrical load of the vehicle and the heat producing load.

SUMMARY OF THE INVENTION

An object of this invention is to provide an improved auxiliary heating system for rapidly supplying heat for use in a vehicle.

Another object of this invention is to provide a simple, inexpensive and reliable power generating system suitable for use in a vehicle which will continuously deliver a substantial amount of current to heating elements which are the only source of heat therefor while simultaneously supplying power to conventional electrical circuitry.

A further object is to provide an electrical power and instant heat generating system which includes circuitry and control devices suitable for operating in cooperation with the conventional heating system of vehicles employing either air or water cooled engines.

The electrical power and quick heat generating system for a vehicle includes first and second electrical generator means which may be rotating field alternators. The output of the first alternator is coupled to a conventional electrical load and the output of the second alternator is coupled to resistive elements comprising an auxiliary heat producing load. The alternators are connected in tandem fashion to a common shaft and have independent control circuits connected between the battery and field windings thereof so that their output voltages may be independently controlled. The control circuitry for the second alternator may include temperature responsive switches located either in a plenum chamber or in a fluid path for the conventional heating system. Moreover, a fan of a conventional heating system may be interconnected with the control circuitry for the second alternator so that either the fan is initiated if the electrical heating system is providing heat or the electrical heating system will provide heat if the motor speed control for the fan is adjusted to a predetermined position.

DETAILED DESCRIPTION OF THE PREFERRED EMBODIMENTS

Figure 1:
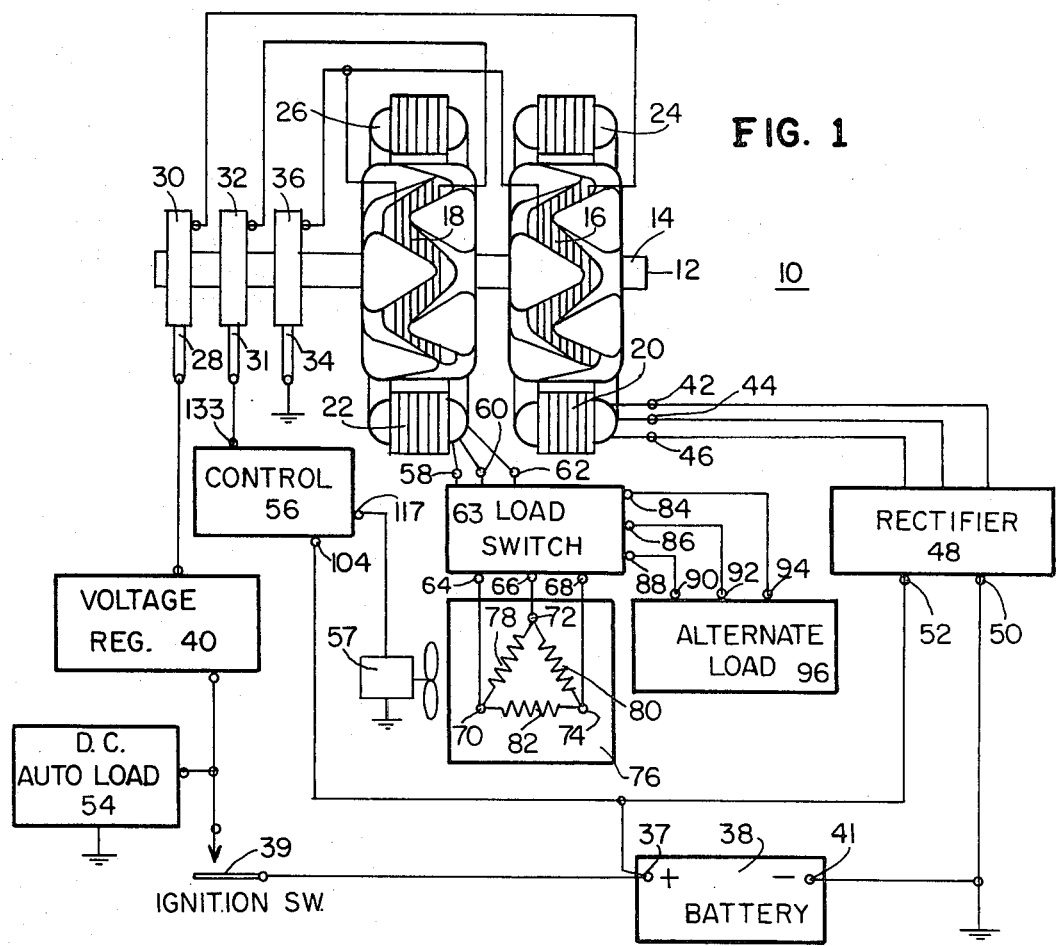
FIG. 1 illustrates two independently controlled alternators connected in tandem to a common shaft.

Referring first to FIG. 1, a unique mechanical and electrical arrangement for an electrical power generating system 10 is shown which simultaneously supplies the electrical requirements of conventional automotive or other vehicle type circuitry, such as that of boats and airplanes, and of an electrical heating load. The system is suitable for use in vehicles employing either air or water cooled engines. End 12 of drive shaft 14 may be connected to a pulley (not shown) which is driven by the fan belt of an engine in a known manner. Field windings 16 and 18 are mechanically connected in tandem to shaft 14 so that they are rotated thereby. Stator windings 20 and 22 are located in close proximity to and enclose respective field windings 16 and 18. Housing 24, which includes field winding 16 and stator winding 20, and housing 26, which includes field winding 18 and stator winding 22, may be mechanically affixed either to the engine or frame of the vehicle. In FIG. 1, portions of the housings and stator windings are shown cut away to reveal the field windings.

The alternators included in housings 24 and 26 are thus connected in a tandem fashion to a common shaft 14, to reduce cost, installation, and drive problems created by completely separate alternators. Slip ring 30, which is also connected to shaft 14 and brush 28 provide an electrical connection to one end of field winding 16. Similarly, brush 31 and slip ring 32 provide connection to one end of field winding 18. Brush 34 and slip ring 36 provide a conductive path from a ground or reference potential to the other ends of field windings 16 and 18. The output voltages of alternators 24 and 26, developed across respective stator windings 20 and 22, are separately controlled by regulating the direct current (D.C.) voltages applied through brushes 28 and 31 to respective field windings 16 and 18.

The positive terminal 37 of automotive storage battery 38 is connected in series through ignition switch 39, voltage regulator 40 and field winding 16 to a ground which is connected to the negative terminal 41 of the battery. Therefore, if ignition switch 39 is closed, field current is provided from battery 37 to field winding 16. With the energized field winding 16 being rotated by shaft 14, the magnetic flux created by the field current flowing in the inductance thereof cuts across stator windings 20 to provide an alternating current (A.C.) voltage at output terminals 42, 44, and 46 thereof. If stator winding 20 is comprised of three Y or delta connected windings, a three phase A.C. output voltage is developed between terminals 42, 44, and 46. A three phase rectifier 48, which is connected to output terminals 42, 44, and 46 in the conventional manner provides a D.C. potential between its output terminals 50, which is connected to the ground, and 52, which is connected to positive battery terminal 37 and to ignition switch 39.

Voltage regulator 40, controls the amplitude of the field current applied to winding 16 in the known manner and thereby controls or regulates the amplitude of the D.C. voltage developed across rectifier output terminals 50 and 52. D.C. or conventional automotive load 54, which may include the ignition system, radio, air-conditioner, lamps etc. of the automobile is coupled through ignition switch 39 to the output terminal 37 of battery 38. Therefore, the alternator included in housing 24 supplies the needs of the conventional electrical load 54 of the automotive vehicle and it is controlled by regulator 40.

Output terminal 52 of rectifier 48 and battery terminal 37 are connected through control means or circuit 56, brush 31 and slip-ring 32, and field winding 18 of the alternator included in housing 26, to ground, Thus, if control circuit 56 is rendered conductive, field current is applied to winding 18. With the energized field winding 18 being rotated by shaft 14, the magnetic flux created by the field current flowing in the inductance thereof cuts across stator winding 22 to provide an A.C. voltage thereacross. If stator winding 22 is comprised of Y or delta connected windings, a three phase A.C. voltage is developed between output terminals 58, 60, and 62. Control circuit 56 is also connected to the conventional automotive fan 57.

The input terminals of load switch 63 are connected to alternator output terminals 58, 60, and 62. Load switch 63 has output terminals 64, 66, and 68 which are respectively coupled to nodes 70, 72, and 74 of resistive heating load 76. Delta connected heating elements 78, 80, and 82, which may be made from a Nickel-Chromium alloy, comprise heating load 76 and provide heat immediately upon the application of electrical power thereto. These heating elements are located adjacent to fan 57 so that air heated thereby can be forced into the passenger compartment. Furthermore, output terminals 84, 86, and 88 of load switch 63 are connected to the input terminals 90, 92, and 94 of alternate load 96. Load switch 63 selectively connects alternator output terminals 58, 60, and 62 to either heating load 76 or to alternate load 96 thereby facilitating the application of an A.C. voltage having an unregulated amplifier and consequently, providing a substantial quantity of electrical power thereto.

Figure 2:
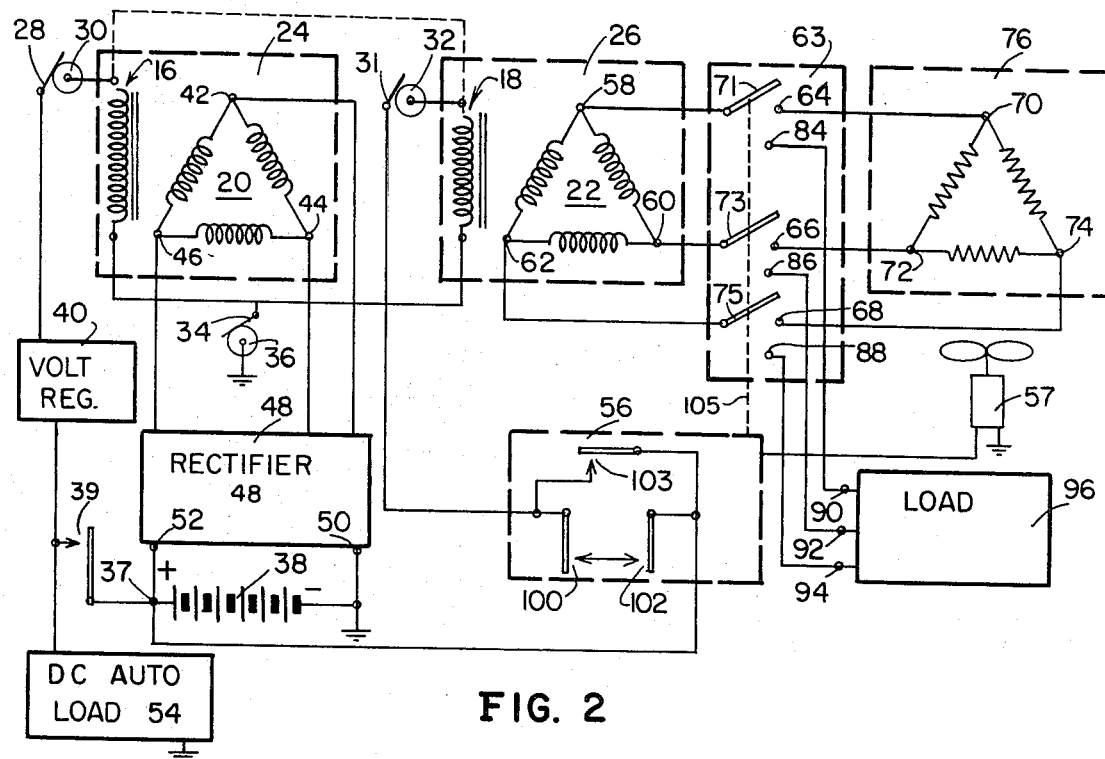
FIG. 2 is a schematic diagram of the alternators and control circuits of FIG. 1.

Referring now to FIG. 2, the generating system 10 of FIG. 1 has been redrawn in schematic form to more clearly illustrate one possible arrangement of components therefor. Corresponding reference numbers from FIG. 1 have been transferred to FIG. 2 where appropriate. Stator windings 20 and 22 of FIG. 1 are shown to be connected in a delta fashion in FIG. 2. Also, the control circuit 56 of FIG. 1 is illustrated in FIG. 2 as including a temperature sensitive switch 100 which may be located in the plenum chamber of the automotive vehicle and which is connected in series with a manually operable switch 102, located at a conventional place with respect to the operation of the heating system. Override switch 103 is connected in parallel with the series connection of switches 100 and 102. Moreover, load switch 63 of FIG. 1, as shown in FIG. 2, is comprised of three ganged sections each including a single pole, double throw switch. These sections may be included in a single structure such as a well known rotary switch so that all of the sections operate simultaneously. When poles 71, 73, and 75 are switched to a first position into engagement with output contacts 64, 66, and 68, respectively, power is delivered from stator winding 22 to the quick heat load 76. On the other hand, if poles 71, 73, and 75 are switched to a second position, into engagement with contacts 84, 86, and 88, respectively, electrical power is delivered from stator winding 22 to terminals 90, 92, and 94 of the alternate load 96 which might be an air-conditioner or some other electrical load requiring a large quantity of A.C. power. If it is not desired to supply power to an alternate load, outputs 58, 60, and 62 of stator winding 22 may be directly connected to nodes 70, 72, and 74 of resistive heating load 76.

In operation, if quick heat is desired an operator first operates load switch 63 of FIG. 2 to the aforementioned first position and then closes manual switch 102. Manual switch 102 and load switch 63 can be interlocked, as designated by dashed line 105, in a known manner such that load switch 63 cannot be switched unless manual switch 102 is open thereby protecting the contacts of the load switch from deleterious effects of arcing which otherwise might occur. Temperature sensitive switch 100, which may be a bimetal switch of known structure, is designed to open when the temperature in the plenum chamber exceeds a predetermined threshold either because blower 57 fails to operate, thereby allowing the temperature of the heating element to exceed a maximum, or because the conventional heating system is operating at sufficient temperature. Override switch 103 enables energy to be supplied through control means 56 even though temperature sensitive switch 100 is nonconductive. Thus, an operator can obtain quick heat by closing switch 103 even though the temperature in the passenger compartment is equal to or above the opening temperature for switch 100.

Figure 3:
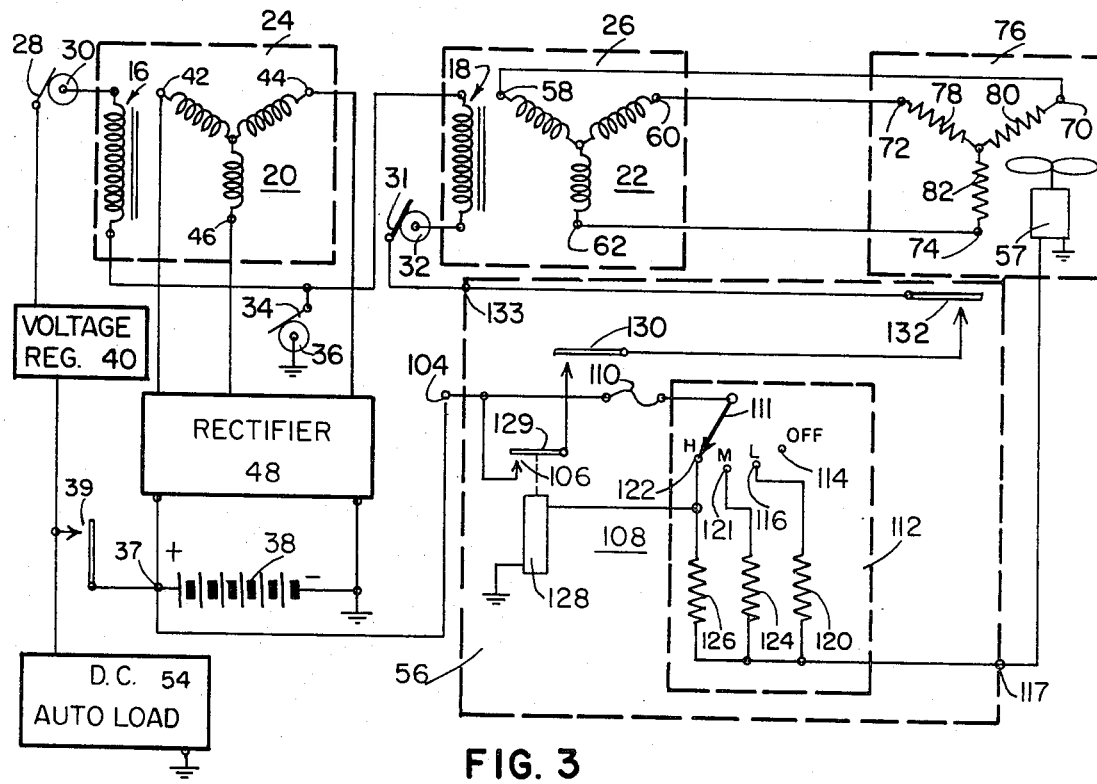
FIG. 3 is another schematic diagram of the system of FIG. 1 wherein the quick heat function is controlled partly by the position of the selecting arm of a fan speed control mechanism.

FIG. 3 illustrates another embodiment of the quick heat system disclosed in FIG. 1 including an alternative control means 56 which enables the system to be operated by a fan motor speed control selector. In FIG. 3, stator windings 20 and 22 of alternators 24 and 26 and the elements of quick heat load 76 are in a Y arrangement. Moreover, output terminals 58, 60, and 62 of stator 22 are connected directly to nodes 70, 72, and 74 of quick heat load 76. Terminal 104 of control means 56 connects positive terminal 37 of battery 38 to fixed contact 106 of quick heat relay 108 and through fuse 110 to the selecting arm 111 of fan motor speed control apparatus 112 which is commonly installed in automotive vehicles.

Selecting arm 111 of apparatus 112 is located at a convenient position in the vehicle with respect to the operator thereof so that he can select either off, low, medium or high speed for fan 57 which is located in close proximity to Y connected heating elements 78, 80, and 82. If selecting arm 111 is operated to make connection with "Off" contact 114, no current is supplied to fan 57. If selecting arm 111 is connected to "Low" speed contact 116, a selected amount of current is supplied through resistor 120 and control means terminal 117 to fan 57. Similarly, if selecting arm 111 is connected either to "Medium" speed contact 121 or "High" speed contact 122, current is respectively supplied either through resistor 124 or resistor 126 to fan 57. The resistances of resistors 120, 124, and 126 are selected to limit the current operating the motor of fan 57 so that the fan respectively operates at either a low, medium, or high angular velocity. Relay coil 128, of quick heat relay 108, is connected between "High" speed contact 122 and ground. Movable contact 129 of relay 108 is connected in series with hot water valve operated switch 130, temperature sensitive switch 132 and control means terminal 133 to field winding 18.

In operation, power will be supplied to relay coil 128, thereby causing movable contact 129 to make connection with fixed contact 106, only if selector arm 111 of blower speed control 112 is operated to its "High" position. Thus the position of selecting arm 111 controls quick heat operation. If switch 130, which is operated by a valve located in the fluid path, i.e., the path for the heated air or water, for the radiator of the conventional heater, and switch 132, which may be a bimetal type located in the plenum chamber, are closed current is applied to field winding 18. Bimetal switch 132 is set to open at a first predetermined temperature, e.g., 120°, to protect the heating elements of load 76 from overheating resulting from malfunction of fan 57. Switch 130, which is closed when the temperature controlled hot water valve is in its full open position, automatically disables the quick heat system when the conventional heat system is warmed up. The hot water valve is designed to begin opening at a third predetermined temperature and fully close at a fourth predetermined temperature. Thus field current will be supplied to winding 18, thereby causing instant heat to be delivered from resistive elements 78, 80, and 82, only if: blower motor speed selector 111 is in its high position, the temperature in the plenum chamber is below a predetermined value, and the temperature of the fluid flowing to the conventional heater is also below another predetermined value. The control means of FIG. 3 is designed to utilize and cooperate with the apparatus normally included in a conventional automotive heating system.

Figure 4:
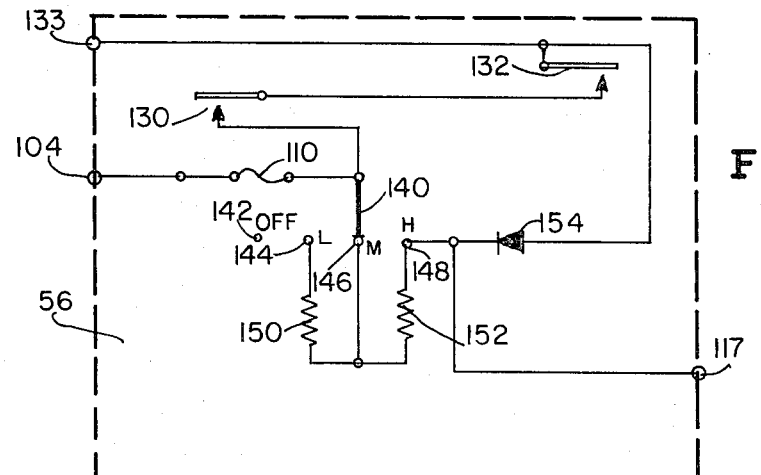
FIG. 4 illustrates another embodiment of a quick heat control device which may be substituted for the quick heat control device of FIG. 3 and wherein the blower motor speed is initiated in response to the operation of the quick heat system.

Referring to FIG. 4, another arrangement for control means 56 is shown which could alternatively be connected between control means terminals 104, 117, and 133 of FIG. 3 in place of the control means thereof. Components of the control system of FIG. 4 and corresponding components of the control system of FIG. 3 are designated by the same reference numbers. The speed selector of FIG. 4 utilizes a sliding switch comprised of a selector 140 which is operable to make contact with anyone of fixed contacts 142, 144, 146, or 148. Resistor 150 is connected between contacts 144 and 146 and resistor 152 is connected between contacts 146 and 148. Since the resistance between terminal 104 and 117 decreases as selector 140 is removed from "Low" speed terminal 144 to "Medium" speed terminal 146 and from "Medium" speed terminal 146 to "High" speed terminal 148, the current and voltage delivered to blower 57 will correspondingly increase thereby increasing the angular velocity of the fan included therein.

The embodiment in FIG. 4 facilitates mandatory control of the speed of blower 57 according to whether quick heat is being produced. In the control system of FIG. 4, one contact of valve operated switch 130 is connected directly through terminal 104 to terminal 37 of battery 38, rather than through relay 108. Thus, if previously described switches 130 and 132 are closed alternator 28 is enabled thereby causing quick heat to be provided by load 76 regardless of the position of blower speed selector 140.

Diode 154 is connected from terminal 133 to "High" speed contact 148 of the fan speed control apparatus. If switches 130 and 132 are closed, the positive potential provided at terminal 133 will forward bias diode 154 and operate fan 57 at a high angular velocity while quick heat is generated. If selector 140 is in contact with "High" speed terminal 148 and either switch 130 or switch 132 is open, diode 154 will be back biased by the positive potential on terminal 122 and, therefore, does not conduct current to the field winding. If desired, field winding 18 could be connected in a like manner through a diode to either of contacts 144 or contact 146 instead of contact 148 to provide other mandatory fan speeds during quick heat production.

Although embodiments of the heat and power producing system of the invention have been described as cooperating with the conventional radiator-fan type heating system commonly employed in automotive vehicles having liquid cooled engines, it is apparent that the system can also be employed in boats, aircraft, and automotive vehicles having air cooled engines. For instance, some foreign cars employ an expensive duct system for conducting heat from a rear mounted engine to a passenger compartment. This heat system employs mechanical valves which are operated by levers and cables. In cold climates such prior art heating systems have been found to have undesirable characteristics. The embodiment of the invention shown in FIG. 3 is adapted for use in such vehicles by removing switch 130 and mounting heating elements 76 such that air heated thereby is communicated directly to the passenger compartment by fan 57 thereby eliminating the need for the ducts and valves previously employed therein.

What has been described, therefore, is a simple and inexpensive electrical generating and heating system for simultaneously fulfilling the electrical demands of a conventional automotive load while providing heat to augment the conventional heating system of a vehicle or to fill the heating needs of the vehicle. Since the system includes a separate alternator for supplying the heating requirements there is no need to switch the output of the conventional alternator between the conventional electrical and quick heat loads as required in some prior art systems. The two separately controlled alternators are constructed in a tandem relation to the same shaft to reduce cost, installation and drive problems.

We claim:
1. An electrical power source for a vehicle having a conventional electrical load and at least one alternate load, such electrical power source including in combination:
   first rotating field alternator means having a first field winding which is rotatable to develop a first output voltage in response to a first control current applied to a first set of energizing terminals;
   first circuit means connecting said first output voltage to the conventional load;
   second rotating field alternator means having a second field winding that is rotatable to develop a second output voltage in response to a second control current applied to a second set of energizing terminals;
   second circuit means connecting said second output voltage to the alternate load;
   drive shaft means mechanically interconnecting said first and second field windings, said drive shaft means being arranged to rotate said first and second field windings in a tandem manner thereby enabling said first and second rotating field alternators to be included in a single housing;
   an electrical source providing a voltage between output terminals thereof;
   first control means selectively coupling said output terminals of said electrical source across said first set of energizing terminals, said electrical source thereby energizing said first alternator means so that it produces said first output voltage; and
   second control means selectively coupling said output terminals of said electrical source across said second set of energizing terminals, said electrical source thereby energizing said second alternator means so that it produces said second output voltage.

2. The electrical power source of claim 1 for providing electrical power to the conventional electrical load, and to first and second alternate loads and further including:
   third circuit means having one set of output terminals connected to said first alternate load and a second set of output terminals connected to said second alternate load and a set of input terminals connected to receive said second output voltage, said third circuit means being coupled to said second control means such that said third circuit means can switch between said first and second alternate loads only if said second alternator means is not energized.

3. The electrical power source of claim 1 further including:
   first brush and slip-ring assembly mechanically connected to said drive shaft means and electrically connected between said first field winding and said first set of energizing terminals;

second brush and slip-ring assembly mechanically connected to said drive shaft means and electrically connected between said second field winding and said second set of energizing terminals; and third brush and slip-ring assembly connected between said first and second field windings and a reference potential;

4. An electrical power source and heat augmentation system for providing power to a conventional automotive load and to heat producing elements arranged in an automotive vehicle having a heating system with a heat radiator utilizing the fluid circulating in the cooling system of the vehicle, a plenum chamber, a fan for forcing air heated by the radiator into a compartment, and a fan speed control mechanism having an input terminal and a switch with a plurality of positions; such power source and heat augmentation system including in combination:

first generator means with a first portion which is rotatable to develop a first output voltage in response to a first control current applied to a first set of energizing terminals, first circuit means connecting said first output voltage to the conventional load;

second generator means with a second portion which is rotatable to develop a second output voltage in response to a second control current applied to a second set of energizing terminals, second circuit means connecting said second output voltage to the heat producing load;

drive shaft means mechanically coupled to rotate said first and second portions in a tandem manner;

electrical supply providing a control voltage between output terminals thereof;

first control means selectively coupling said output terminals of said supply across said first set of energizing terminals thereby energizing said first generator means;

second control means selectively coupling said output terminals of said supply across said second set of energizing terminals thereby energizing said second generator means; and third control means electrically coupling the fan speed control mechanism with the second control means so that the fan is operated whenever the second control means couples said output terminals of said supply across said second set of energizing terminals.

5. The electrical power source and heat augmentation system of claim 4 wherein said third control means includes:

switchable means having control, input and output terminals, said input terminal being connected to said electrical supply, said control terminal being connected to the fan speed control mechanism so that as the fan speed control mechanism is switched into a selected one of its plurality of positions said switchable means is rendered conductive between its input and output terminals; and fourth circuit means connecting said output terminal of said switchable means to said second control means so that said second generator means is rendered opeative only if said fan speed control mechanism is switched to said selected position.

6. The electrical power source and heat augmentation system of claim 4 wherein said second circuit means includes a first temperature responsive switch and a second temperature responsive switch which are connected in series, said first temperature responsive switch being located in the plenum chamber and opening if the temperature of the air in the plenum chamber is greater than a first predetermined value and closing if the temperature of the air in the plenum chamber is less than a second predetermined value; and said second temperature responsive switch being responsive to the temperature of the fluid supplied to the heat radiator, said second temperature responsive switch opening if the temperature of the fluid exceeds a third predetermined value and closing if the temperature of the fluid is less than a fourth predetermined value.

7. The electrical power source and heat augmentation system of claim 4 wherein said second portion of said second generator means is connected through an electron control device to the fan speed control mechanism so that as said second portion is energized the fan is also energized.

* * * * *